(12) United States Patent  (10) Patent No.: US 7,729,596 B2
Senoo  (45) Date of Patent: Jun. 1, 2010

(54) INFORMATION RECODING SYSTEM

(75) Inventor: Junya Senoo, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1532 days.

(21) Appl. No.: 10/995,245

(22) Filed: Nov. 24, 2004

(65) Prior Publication Data

US 2005/0135791 A1    Jun. 23, 2005

(30) Foreign Application Priority Data

Nov. 27, 2003    (JP) ............................. 2003-397433

(51) Int. Cl.
*H04N 5/00* (2006.01)
(52) U.S. Cl. ........................ 386/125; 386/95; 386/126
(58) Field of Classification Search ................... 386/95, 386/125, 126
See application file for complete search history.

(56) References Cited

U.S. PATENT DOCUMENTS

| | | | | |
|---|---|---|---|---|
| 6,141,354 | A * | 10/2000 | Nakatsugawa | 370/465 |
| 7,009,724 | B1 * | 3/2006 | Ihara et al. | 358/1.15 |
| 2001/0033531 | A1 * | 10/2001 | Ozawa et al. | 369/47.12 |
| 2002/0044758 | A1 * | 4/2002 | Kobayashi | 386/52 |
| 2005/0232595 | A1 * | 10/2005 | Hirai | 386/94 |

FOREIGN PATENT DOCUMENTS

| | | |
|---|---|---|
| EP | 0 847 167 A2 | 6/1998 |
| EP | 1 286 543 A2 | 2/2003 |
| JP | 4-349732 | 12/1992 |
| JP | 10-173727 | 6/1998 |
| JP | 11-205358 | 7/1999 |
| JP | 2000-341307 A | 12/2000 |
| JP | 2000-358032 A | 12/2000 |
| JP | 2003-153168 | 5/2003 |
| JP | 2003-289501 | 10/2003 |

* cited by examiner

*Primary Examiner*—Thai Tran
*Assistant Examiner*—Girumsew Wendmagegn
(74) *Attorney, Agent, or Firm*—Morgan, Lewis & Bockius LLP

(57) ABSTRACT

By packet speed setting device, setting is made so as to send out a cycle start packet at predetermined-times speed when image data is transferred from a DV apparatus to a DVD recorder, and by predetermined-times speed dubbing function determination device, it is determined whether or not the DV apparatus has a predetermined-times speed dubbing function when image data recorded on the DV apparatus is dubbed on the DVD recorder at predetermined-times speed. By notification device, the DV apparatus is notified to perform predetermined-times speed dubbing from the DVD recorder in the case of having the predetermined-times speed dubbing function, and by predetermined-times speed dubbing start device, predetermined-times speed dubbing is started by controlling components of the DV apparatus and the DVD recorder related to the predetermined-times speed dubbing by the notification.

8 Claims, 3 Drawing Sheets

INFORMATION RECODING SYSTEM

BACKGROUND OF THE INVENTION

1. Field of the Invention

The present invention relates to an information recording system that makes connection between, for example, an optical disk recording and reproducing apparatus for recording information on an optical disk and reproducing information recorded on the optical disk and a digital video apparatus for outputting a pickup image as digital image data of a predetermined format through a predetermined digital cable.

2. Description of the Related Art

In recent years, an IEEE (Institute of Electrical and Electronics Engineers) 1394 data interface has been known as a digital data interface. In the IEEE1394 data interface, a data transfer rate is higher than that or, for example, a SCSI and as is well known, isochronous communication ensuring that a required data size is sent and received periodically can be conducted. As a result of this, the IEEE1394 data interface is effective in transferring stream data of AV (Audio Visual) etc. in real time.

As a conventional information recording system for mutually conducting communication using such an IEEE1394 data interface, for example, a device constructed by making connection between a DVD recorder for recording information on a DVD (Digital Versatile Disc) or reproducing information recorded on the DVD and a DV (Digital Video) apparatus for outputting a pickup image as digital image data of a predetermined format through a cable of IEEE1394 has been known. In the IEEE1394, time synchronization between the DV apparatus and the DVD recorder connected to the cable can be obtained by carrying a packet far time synchronization called a cycle start packet into the cable of IEEE1394, for example, per 125 microseconds.

When image data recorded on the DV apparatus is dubbed on the DVD recorder in such a conventional information recording system, the image data of the DV apparatus flows through the cable of IEEE1394 in synchronization with the cycle start packet and is recorded on the DVD recorder.

SUMMARY OF THE INVENTION

However, when the image data recorded on the DV apparatus is dubbed on the DVD recorder, the image data of the DV apparatus flows through the cable of IEEE1394 in synchronization with the cycle start packet, so that there was a problem that a dubbing speed depends on the cycle start packet and the dubbing speed cannot be increased anymore and it is difficult to reduce dubbing time.

In the conventional art of JP-A-2000-358032, convenience of a data interface is improved but dubbing is not disclosed, so that the problem as described above cannot be solved. Also, in the conventional art of JP-A-2000-341307, when signals compliant with IEEE1394 are communicated between electronic devices using a half-duplex transmission line, a mismatch between the devices in time information is prevented from occurring but dubbing is not disclosed, so that the problem as described above cannot be solved.

It is an object of the invention to provide an information recording system in which predetermined-times speed dubbing can be performed by being set so as to send out a cycle start packet at predetermined-times speed.

According to one aspect of the invention, there is provided with an information recording system constructed by making connection between an optical disk recording and reproducing apparatus for recording information on an optical disk or reproducing information recorded on the optical disk and a digital video apparatus for outputting a pickup image as digital image data of a predetermined format through a predetermined digital cable, comprising packet a speed setting device for making setting so as to send out a cycle start packet for sending in synchronization at predetermined-times speed when image data is transferred from the digital video apparatus to the optical disk recording apparatus, a predetermined-times speed dubbing function determination device for determining whether or not the digital video apparatus connected to the optical disk recording and reproducing apparatus has a predetermined-times speed dubbing function when image data recorded on the digital video apparatus is dubbed on the optical disk recording and reproducing apparatus at a predetermined-times speed, notification device for notifying the digital video apparatus to perform predetermined-times speed dubbing from the optical disk recording and reproducing apparatus in the case of determining that the digital video apparatus has the predetermined-times speed dubbing function, and a predetermined-times speed dubbing start device for starting predetermined-times speed dubbing by controlling components of the digital video apparatus and the optical disk recording and reproducing apparatus related to the predetermined-times speed dubbing by the notification.

In this configuration, by a packet speed setting device, setting is made so as to send out a cycle start packet for sending in synchronization at predetermined-times speed when image data is transferred from the digital video apparatus to the optical disk recording apparatus. By the predetermined-times speed dubbing function determination device, it is determined whether or not the digital video apparatus connected to the optical disk recording and reproducing apparatus has a predetermined-times speed dubbing function when image data recorded on the digital video apparatus is dubbed on the optical disk recording and reproducing apparatus at predetermined-times speed. By the notification device, the digital video apparatus is notified to perform predetermined-times speed dubbing from the optical disk recording and reproducing apparatus in the case of determining that the digital video apparatus has the predetermined-times speed dubbing function, and by the predetermined-times speed dubbing start device, predetermined-times speed dubbing is started by controlling components of the digital video apparatus and the optical disk recording and reproducing apparatus related to the predetermined-times speed dubbing by the notification.

According to this configuration, by being set so as to send out the cycle start packet at the predetermined-times speed, the predetermined-times speed dubbing can be performed and dubbing time can be reduced.

According to another aspect of the invention, there is provided with an information recording system constructed by making connection between an information recording and reproducing apparatus for recording information on a record medium or reproducing information recorded on the record medium and an image data output apparatus for outputting recorded image data through a predetermined digital cable, characterized in that setting is made so as to send out a cycle start packet for sending in synchronization at predetermined-times speed when image data is transferred from the image data output apparatus to the information recording and reproducing apparatus, and predetermined-times speed dubbing is started by controlling components of the image data output apparatus and the information recording and reproducing apparatus related to the predetermined-times speed dubbing when image data recorded on the image data output apparatus is dubbed on the information recording and reproducing apparatus at predetermined-times speed.

In this configuration, setting is made so as to send out a cycle start packet for sending in synchronization at predetermined-times speed when image data is transferred from the image data output apparatus to the information recording and reproducing apparatus, and when image data recorded on the image data output apparatus is dubbed on the information recording and reproducing apparatus at predetermined times speed, components of the image data output apparatus and the information recording and reproducing apparatus related to predetermined-times speed dubbing are controlled and the predetermined-times speed dubbing is started.

According to this configuration, by being set so as to send out the cycle start packet at the predetermined-times speed, the predetermined-times speed dubbing can be performed and dubbing time can be reduced.

According to another aspect of the invention, the packet speed setting device for making setting so as to send out a cycle start packet for sending in synchronization at predetermined-times speed when image data is transferred from the image data output apparatus to the information recording apparatus, the predetermined-times speed dubbing function determination device for determining whether or not the image data output apparatus connected to the information recording and reproducing apparatus has a predetermined-times speed dubbing function when image data recorded on the image data output apparatus is dubbed on the information recording and reproducing apparatus at predetermined-times speed, the notification device for notifying the image data output apparatus to perform predetermined-times speed dubbing from the information recording and reproducing apparatus in the case of determining that the image data output apparatus has the predetermined-times speed dubbing function, and the predetermined-times speed dubbing start device for starting predetermined-times speed dubbing by controlling components of the image data output apparatus and the information recording and reproducing apparatus related to the predetermined-times speed dubbing by the notification, so that the predetermined-times speed dubbing can be performed and dubbing time can be reduced.

According to another aspect of the invention, there is provided with the record medium is an optical disk and the information recording and reproducing apparatus is an optical disk recording and reproducing apparatus, so that image data from the image data output apparatus can be dubbed on the optical disk recording and reproducing apparatus.

According to another aspect of the invention, there is provide with the image data output apparatus is a digital video apparatus for outputting a pickup image as digital image data of a predetermined format, so that image data from the digital video apparatus can be dubbed on the information recording and reproducing apparatus.

In an information recording system constructed by making connection between an optical disk recording and reproducing apparatus for recording information on an optical disk or reproducing information recorded on the optical disk and a digital video apparatus for outputting a pickup image as digital image data of a predetermined format through a predetermined digital cable, the information recording system includes the packet speed setting device for making setting so as to send out a cycle start packet for sending in synchronization at predetermined-times speed when image data is transferred from the digital video apparatus to the optical disk recording apparatus, the predetermined-times speed dubbing function determination device for determining whether or not the digital video apparatus connected to the optical disk recording and reproducing apparatus has a predetermined-times speed dubbing function when image data recorded on the digital video apparatus is dubbed on the optical disk recording and reproducing apparatus at predetermined-times speed, the notification device for notifying the digital video apparatus to perform predetermined-times speed dubbing from the optical disk recording and reproducing apparatus in the case of determining that the digital video apparatus has the predetermined-times speed dubbing function, and the predetermined-times speed dubbing start device for starting predetermined-times speed dubbing by controlling components of the digital video apparatus and the optical disk recording and reproducing apparatus related to the predetermined-times speed dubbing by the notification, so that by being set so as to send out the cycle start packet at the predetermined-times speed, the predetermined-times speed dubbing can be performed and dubbing time can be reduced.

In an information recording system constructed by making connection between an information recording and reproducing apparatus for recording information on a record medium or reproducing information recorded on the record medium and an image data output apparatus for outputting recorded image data through a predetermined digital cable, it is constructed so that setting is made so as to send out a cycle start packet for sending in synchronization at predetermined-times speed when image data is transferred from the image data output apparatus to the information recording and reproducing apparatus and predetermined-times speed dubbing is started by controlling components of the image data output apparatus and the information recording and reproducing apparatus related to the predetermined-times speed dubbing when image data recorded on the image data output apparatus is dubbed on the information recording and reproducing apparatus at predetermined-times speed, so that by being set so as to send out the cycle start packet at the predetermined-times speed, the predetermined-times speed dubbing can be performed and dubbing time can be reduced.

BRIEF DESCRIPTION OF THE DRAWINGS

These and other objects and advantages of this invention will become more fully apparent from the following detailed description taken with the accompanying drawings in which.

DESCRIPTION OF THE PREFERRED EMBODIMENTS

Figure 1:
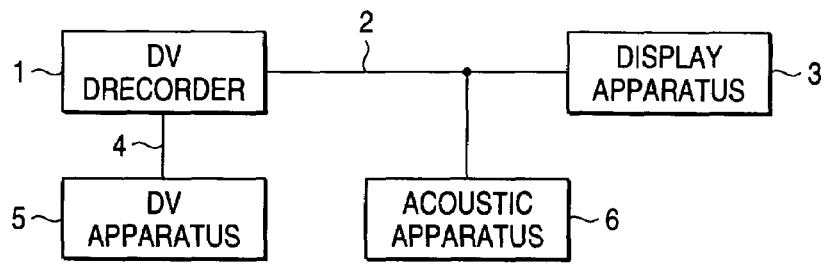
FIG. 1 is a block diagram showing a configuration of an information recording system according to one embodiment of the invention.

An embodiment of the invention will be described below with reference to the accompanying drawings. FIG. 1 is a block diagram showing a configuration of an information recording system according to one embodiment of the invention. This information recording system includes a DVD recorder 1 for recording information on a DVD (Digital Versatile Disc) which is an optical disk or reproducing information recorded on the DVD, a display apparatus 3 and an acoustic apparatus 6 connected to this DVD recorder 1 through an analog AV cable 2, and a DV (Digital Video)

apparatus such as a DVC (Digital Video Camera) connected to the DVD recorder 1 through an IEEE (Institute of Electrical and Electronics Engineers) 1394 cable 4.

Figure 2:
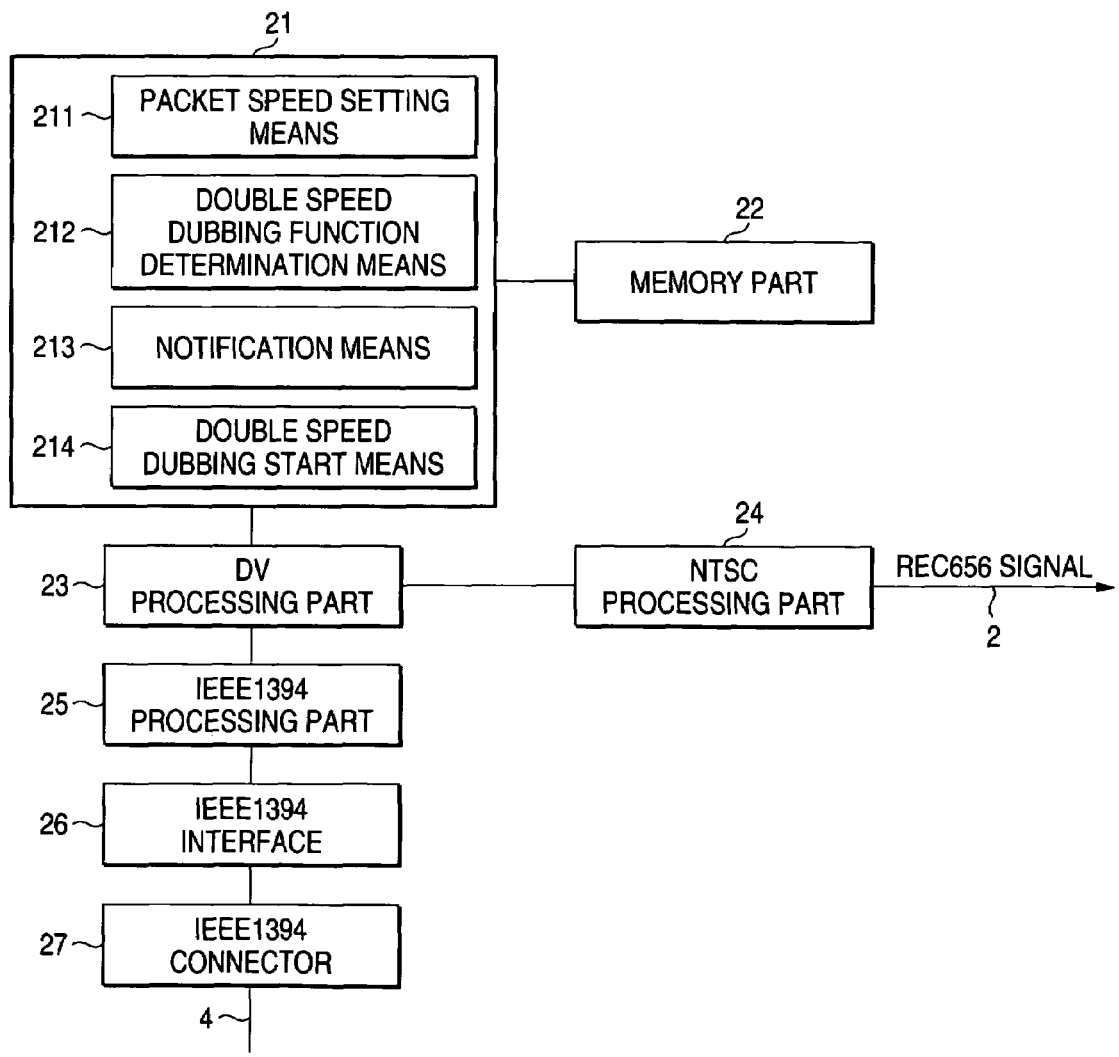
FIG. 2 is a block diagram showing components related to a dubbing action in a DVD recorder in FIG. 1.

FIG. 2 is a block diagram showing components related to a dubbing action in the DUD recorder 1 in FIG. 1. This DVD recorder 1 includes a CPU part 21 for performing arithmetic processing for controlling each of the components, a memory part 22 for storing data necessary for the arithmetic processing of this CPU part 21, a DV processing part 23 for processing a DV signal constructed by 30 frames per second, an NTSC processing part 24 for creating, for example, a REC656 signal which is a TV signal by an NTSC (National Television System Committee) system, an IEEE1394 processing part 25 for performing IEEE1394 processing, an IEEE1394 interface 26 of a physical chip for managing a transfer rate of data of IEEE1394, and an IEEE1394 connector 27. An output of the NTSC processing part 24 is connected to the display apparatus 3 and the acoustic apparatus 6 shown in FIG. 1 through the analog AV cable 2. The IEEE1394 connector 27 is connected to the DV apparatus 5 shown in FIG. 1 through the IEEE1394 cable 4.

The CPU part 21 of this DVD recorder 1 includes a packet speed setting device 211 for making setting so as to send out a cycle start packet for sending in synchronization at predetermined-times speed when image data is transferred from the DV apparatus 5 to the DVD recorder 1, a predetermined-times speed dubbing function determination device 212 for determining whether or not the DV apparatus 5 connected to the DVD recorder 1 has a double speed dubbing function when image data recorded on the DV apparatus 5 is dubbed on the DVD recorder 1 at double speed, a notification device 213 for notifying the DV apparatus to perform predetermined-times speed dubbing from the DVD recorder 1 in the case of determining that the DV apparatus 5 has the double speed dubbing function, and a predetermined-times speed dubbing start device 214 for starting predetermined-times speed dubbing by controlling components of the DV apparatus 5 and the DVD recorder 1 related to the predetermined-times speed dubbing by the notification.

Figure 3:
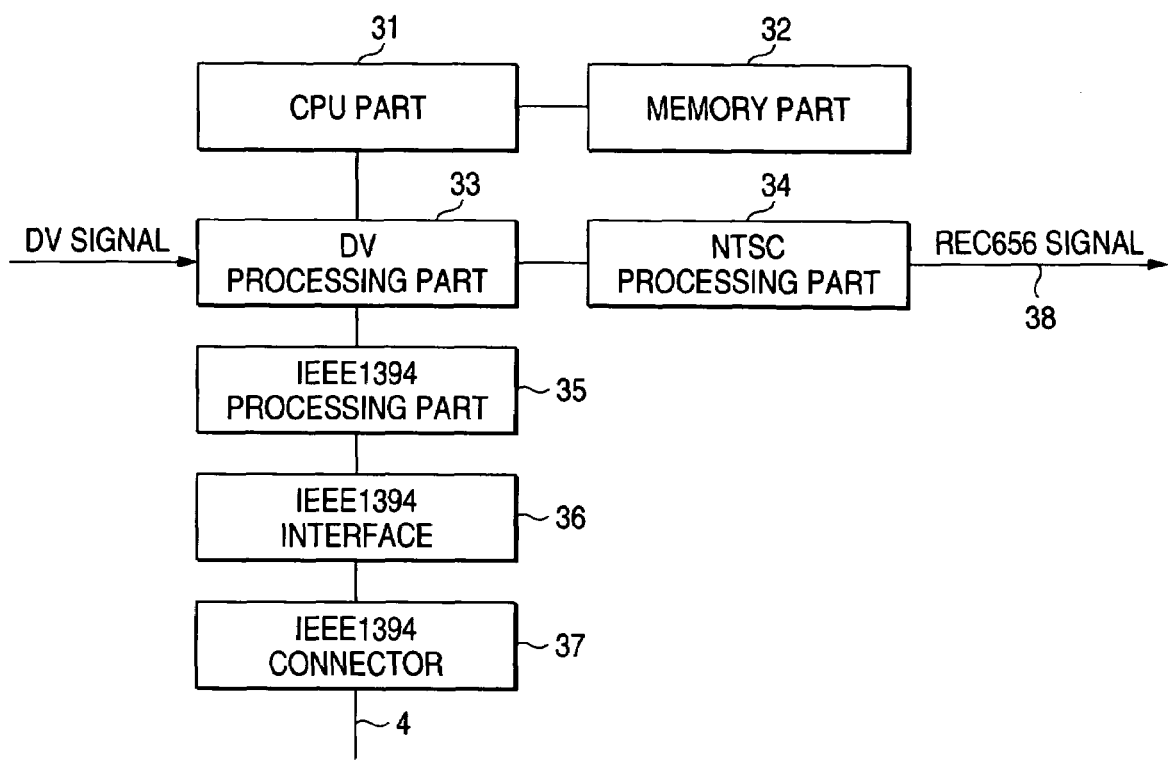
FIG. 3 is a block diagram showing components related to a dubbing action in a DV apparatus in FIG. 1.

FIG. 3 is a block diagram showing components related to a dubbing action in the DV apparatus 5 in FIG. 1. This DV apparatus 5 includes a CPU part 31 for performing arithmetic processing for controlling each of the components, a memory part 32 for storing data necessary for the arithmetic processing of this CPU part 31, a DV processing part 33 for processing a DV signal constructed by 30 frames per second, an NTSC processing part 34 for creating, for example, a REC656 signal which is a TV signal by an NTSC system, an IEEE1394 processing part 35 for performing IEEE1394 processing, an IEEE1394 interface 36 of a physical chip for managing a transfer rate of data of IEEE1394, and an IEEE1394 connector 37. An output of the NTSC processing part 34 can be connected to the display apparatus 3 etc. shown in FIG. 1 or a display part (not shown) of the DV apparatus 5 through an analog AV cable 38.

Figure 4:
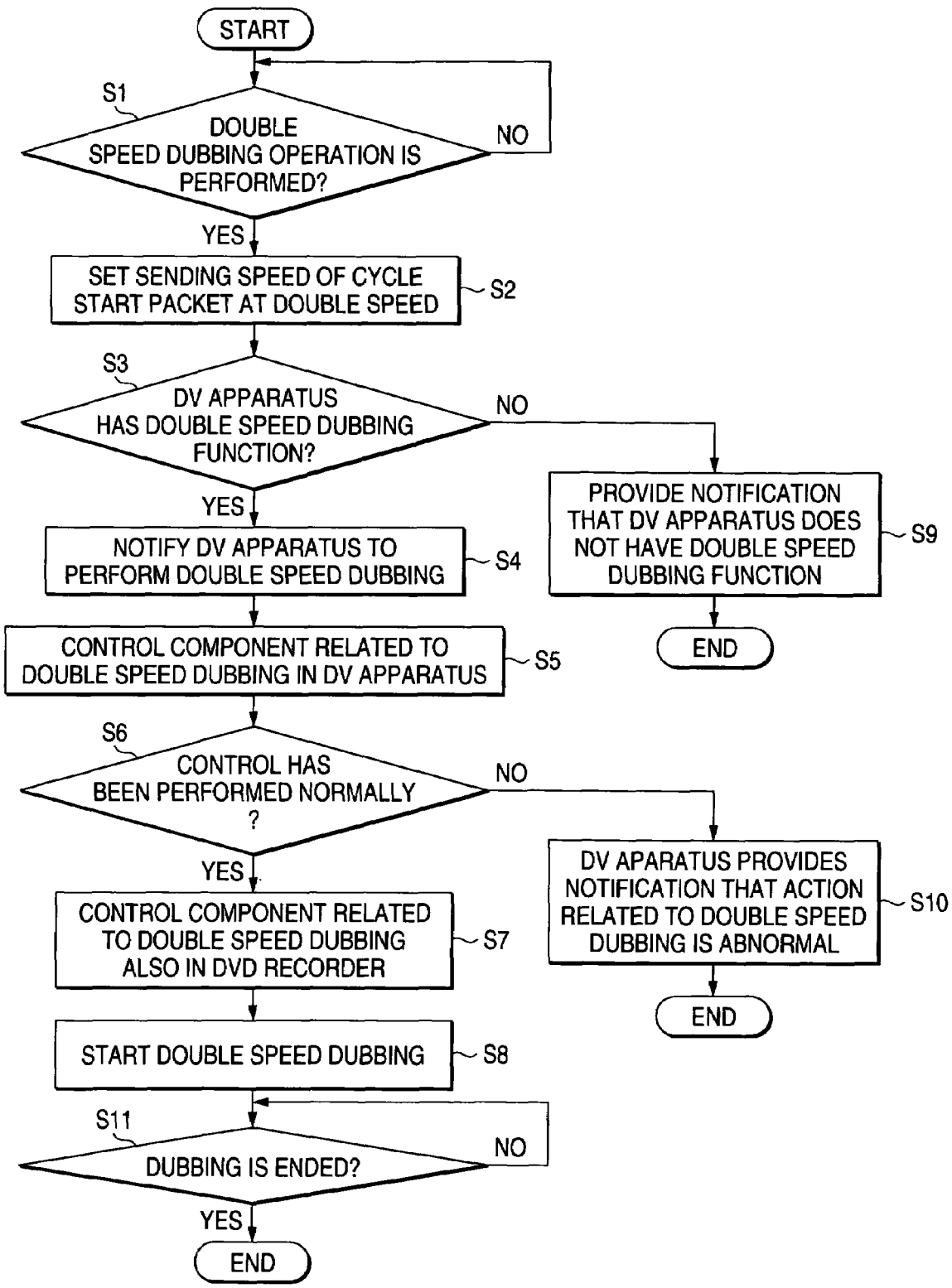
FIG. 4 is a flowchart describing processing in the case that image data recorded on the DV apparatus is dubbed on the DVD recorder at double speed in the embodiment.

FIG. 4 is a flowchart describing processing in the case that image data recorded on the DV apparatus 5 is dubbed on the DVD recorder 1 at double speed in the present embodiment. The processing in the case of double speed dubbing will be described below with reference to this flowchart.

When a user performs a double speed dubbing operation with respect to the DVD recorder 1 (step S1), in order that image data from the DV apparatus 5 can be transferred to the DVD recorder 1 at double speed, a sending speed of a cycle start packet in the DV apparatus 5 is set at double speed by the packet speed setting device 211 of the CPU part 21 provided in the DVD recorder 1 (step S2).

Next, the double speed dubbing function determination device 212 of the CPU part 21 provided in the DVD recorder 1 determines whether or not the DV apparatus 5 connected to the DVD recorder 1 has a double speed dubbing function. For example, when an IEEE1394 interface is mounted in the DV apparatus 5, it is considered that the DV apparatus has the double speed dubbing function, so that it is determined whether or not the IEEE1394 interface 36 is mounted in the DV apparatus 5.

Thereby, when the IEEE1394 interface 36 is mounted in the DV apparatus 5 and the double speed dubbing function is had, the CPU part 21 of the DVD recorder notifies the DV apparatus 5 to perform double speed dubbing by the notification device 213 (step S4). On the other hand, when the IEEE1394 interface is not mounted in the DV apparatus 5 and the double speed dubbing function is not had, notification that the DV apparatus 5 does not have the double speed dubbing function is provided by the notification device 213 of the CPU part 21 provided in the DVD recorder 1 (step S9).

After the DV apparatus 5 is notified to perform the double speed dubbing (step S4), components (the DV processing part 33, the IEEE1394 processing part 35, the IEEE1394 interface 36) related to the double speed dubbing are controlled in the DV apparatus 5 (step S5). Then, the CPU part 21 of the DVD recorder 1 determines whether or not control of the components of the DV apparatus 5 has been performed normally (step S6), and when the control has not been performed normally, the DV apparatus 5 provides notification that an action related to the double speed dubbing is abnormal (step S10), and when the control has been performed normally, the DVD recorder 1 also controls components (the DV processing part 23, the IEEE1394 processing part 25, the IEEE1394 interface 26) related to the double speed dubbing (step S7). Thereafter, according to the double speed cycle start packet set in step S2, the image data of the DV apparatus 5 is sent to the DVD recorder 1 at double speed and the double speed dubbing is started (step S8) and when the dubbing is ended (step S11), the present processing ends.

In the embodiment described above, the processing for performing dubbing at double speed has been described, but it is not limited to the double speed and, for example, dubbing at quadruple speed, octuple speed, etc. can also be performed. For example, DV data is constructed by 30 frames per second but in data of MPEG, a method for dividing data into eight portions and sending the data is adopted, so that an occupancy ratio of a data bus is small. Therefore, the amount of data of MPEG is small, so that the dubbing at quadruple speed or octuple speed can also be performed. Also, when a hard disk recorder instead of the DVD recorder is used, the dubbing at quadruple speed, octuple speed, etc. can also be performed. Also, the invention can be applied to components having standards other than IEEE1394 standards.

According to the embodiment described above, it is constructed so that setting is made so as to send out a cycle start packet for sending in synchronization at double speed when image data is transferred from, for example, the DV apparatus 5 acting as an image data output apparatus to, for example, the DVD recorder 1 acting as an information recording and reproducing apparatus and double speed dubbing is started by controlling components of the DV apparatus 5 and the DVD recorder 1 related to the double speed dubbing when image data recorded on the DV apparatus 5 is dubbed on the DVD recorder 1 at predetermined-times speed, so that by being set so as to send out the cycle start packet at the double speed, the double speed dubbing can be performed and dubbing time reduces half the conventional dubbing time.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An information recording system constructed by making connection between an optical disk recording and reproducing apparatus for recording information on an optical disk and reproducing information recorded on the optical disk and a digital video apparatus for outputting a pickup image as digital image data of a predetermined format through a predetermined digital cable, the information recording system comprising;
    packet speed setting means for making setting so as to send out a cycle start packet for sending in synchronization at predetermined-times speed when image data is transferred from the digital video apparatus to the optical disk recording apparatus,
    predetermined-times speed dubbing function determination means for determining whether or not the digital video apparatus connected to the optical disk recording and reproducing apparatus has a predetermined-times speed dubbing function when image data recorded on the digital video apparatus is dubbed on the optical disk recording and reproducing apparatus at predetermined-times speed,
    notification means for notifying the digital video apparatus to perform predetermined-times speed dubbing from the optical disk recording and reproducing apparatus in the case of determining that the digital video apparatus has the predetermined-times speed dubbing function, and
    predetermined-times speed dubbing start means for starting predetermined-times speed dubbing by controlling components of the digital video apparatus and the optical disk recording and reproducing apparatus related to the predetermined-times speed dubbing by the notification.

2. An information recording system constructed by making connection between an information recording and reproducing apparatus for recording information on a record medium and reproducing information recorded on the record medium and an image data output apparatus for outputting recorded image data through a predetermined digital cable, the information recording system comprising:
    predetermined-times speed dubbing function determination means for determining whether or not the image data output apparatus connected to the information recording and reproducing apparatus has a predetermined-times speed dubbing function when image data recorded on the image data output apparatus is dubbed on the information recording and reproducing apparatus at predetermined-times speed;
    notification means for notifying the image data output apparatus to perform predetermined-times speed dubbing from the information recording and reproducing apparatus in the case of determining that the image data output apparatus has the predetermined-times speed dubbing function; and,
    predetermined-times speed dubbing start means for starting predetermined-times speed dubbing by controlling components of the image data output apparatus and the information recording and reproducing apparatus related to the predetermined-times speed dubbing by the notification.

3. An information recording system according to claim 2, wherein
    the record medium is an optical disk and the information recording and reproducing apparatus is an optical disk recording and reproducing apparatus.

4. An information recording system according to claim 2, wherein
    the image data output apparatus is a digital video apparatus for outputting a pickup image as digital image data of a predetermined format.

5. An information recording system comprising:
    an optical disk recording and reproducing apparatus that records information on an optical disk and reproduces information recorded on the optical disk;
    a digital video apparatus that outputs a pickup image as digital image data of a predetermined format, wherein the information recording system connects between the optical disk recording and reproducing apparatus and the digital video apparatus through a predetermined digital cable,
    a packet speed setting device that sends out a cycle start packet which sends in synchronization at predetermined-times speed when the digital image data is transferred from the digital video apparatus to the optical disk recording apparatus,
    a predetermined-times speed dubbing function determination device that determines whether or not the digital video apparatus connected to the optical disk recording and reproducing apparatus has a predetermined-times speed dubbing function when image data recorded on the digital video apparatus is dubbed on the optical disk recording and reproducing apparatus at predetermined-times speed,
    a notification device that notifies the digital video apparatus to perform predetermined-times speed dubbing from the optical disk recording and reproducing apparatus in the case of determining that the digital video apparatus has the predetermined-times speed dubbing function, and
    a predetermined-times speed dubbing start device that starts predetermined-times speed dubbing by controlling members of the digital video apparatus and the optical disk recording and reproducing apparatus related to the predetermined-times speed dubbing by the notification.

6. An information recording system comprising:
    a packet speed setting device sends out a cycle start packet for sending in synchronization at predetermined-times speed when image data is transferred from an image data output apparatus to an information recording and reproducing apparatus,
    a predetermined-times speed dubbing function determination device which determines whether or not the image data output apparatus connected to the information recording and reproducing apparatus has a predetermined-times speed dubbing function when image data recorded on the image data output apparatus is dubbed on the information recording and reproducing apparatus at predetermined-times speed,
    a notification device that notifies the image data output apparatus to perform predetermined-times speed dubbing from the information recording and reproducing apparatus in the case of determining that the image data output apparatus has the predetermined-times speed dubbing function, and a predetermined-times speed dubbing start device which staffs predetermined-times speed dubbing by controlling components of the image data output apparatus and the information recording and reproducing apparatus related to the predetermined-times speed dubbing by the notification.

7. An information recording system according to claim 6, wherein a record medium to be mounted on the information recording and reproducing apparatus is an optical disk and the information recording and reproducing apparatus is an optical disk recording and reproducing apparatus.

8. An information recording system according to claim 6, wherein the image data output apparatus is a digital video apparatus that outputs a pickup image as digital image data of a predetermined format.

* * * * *